United States Patent
Yang et al.

(10) Patent No.: US 8,576,563 B2
(45) Date of Patent: Nov. 5, 2013

(54) HANDLE FOR A TOUCH SCREEN COMPUTING DEVICE

(75) Inventors: Dan Dan Yang, Ottawa (CA); Cecile Lu, Ottawa (CA); Zibin Lu, Ottawa (CA)

(73) Assignee: Rullingnet Corporation Limited, Hong Kong (HK)

( * ) Notice: Subject to any disclaimer, the term of this patent is extended or adjusted under 35 U.S.C. 154(b) by 55 days.

(21) Appl. No.: 12/892,052

(22) Filed: Sep. 28, 2010

(65) Prior Publication Data

US 2012/0075801 A1    Mar. 29, 2012

(51) Int. Cl.
*H05K 5/00* (2006.01)
*H05K 7/00* (2006.01)
*B65D 85/00* (2006.01)

(52) U.S. Cl.
USPC .............. 361/679.59; 361/679.3; 361/679.56; 206/701

(58) Field of Classification Search
USPC ............ 361/679.59, 679.56, 679.3; 206/320, 206/701
See application file for complete search history.

(56) References Cited

U.S. PATENT DOCUMENTS

| | | | | |
|---|---|---|---|---|
| 6,101,086 A | * | 8/2000 | Kim et al. | 361/679.55 |
| 6,532,152 B1 | * | 3/2003 | White et al. | 361/692 |
| 2007/0139874 A1 | * | 6/2007 | Tanaka | 361/683 |
| 2007/0235370 A1 | * | 10/2007 | Reale | 206/701 |
| 2008/0256807 A1 | * | 10/2008 | Kirkup | 30/147 |

* cited by examiner

*Primary Examiner* — Anthony Haughton
(74) *Attorney, Agent, or Firm* — Brion Raffoul

(57) ABSTRACT

A handle for a computing device having a touch screen, wherein the handle is affixed to the computing device, and the handle is made of material that is suitable for gripping by an infant and the handle is of a specific size range such that the handle is capable of being gripped by an infant.

7 Claims, 5 Drawing Sheets

HANDLE FOR A TOUCH SCREEN COMPUTING DEVICE

FIELD OF THE INVENTION

The present invention relates to the field of hand-held personal computing devices.

BACKGROUND OF THE INVENTION

Today, hand-held computing devices, such as the iPod™ or iTouch™, by Apple Inc., or the tablet PC (personal computer), such as the iPad™, also by Apple Inc., are ubiquitous. Many people enjoy them because of the myriad of software applications, such as games and some very helpful tools for navigating both physical and virtual stores. The latest versions of these hand-held devices also have mobile communications capability, which enable users to easily download applications and data to these devices. Today's tablets are also very popular because they have touch screen capability, which makes software applications more readily usable.

For the purposes of this document, a touch screen is defined as an electronic visual display that can detect the presence and location of a touch within the display area. The term generally refers to touching the display of the device with a finger or hand. Touch screens can also sense the touch of other objects, such as a stylus.

The number of software applications that are being developed for hand-held computing devices are on the rise. Software developers are creating applications for both adults and children alike. Applications for infants, toddlers, and small or young children are also on the rise.

However, babies and disabled children or persons have difficulty holding tablets and other hand-held computing devices. Therefore, there is a need for a device that can enable babies and/or disabled persons to hold and interact with such computing devices.

SUMMARY OF INVENTION

The present invention provides a handle for a computing device having a touch screen, wherein the handle is affixed to the computing device and the handle is made of material that is suitable for gripping by an infant and the handle is of a specific size range such that the handle is capable of being gripped by an infant.

In one aspect, the present invention provides a handle for a computing device, wherein the handle is affixed to the computing device and the handle is made of material that is suitable for gripping by an infant and the handle is of a specific size range such that the handle is capable of being gripped by an infant.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The present invention is not limited to the preferred embodiments described below. Other variations to the handle are contemplated by the present invention.

Figure 1:
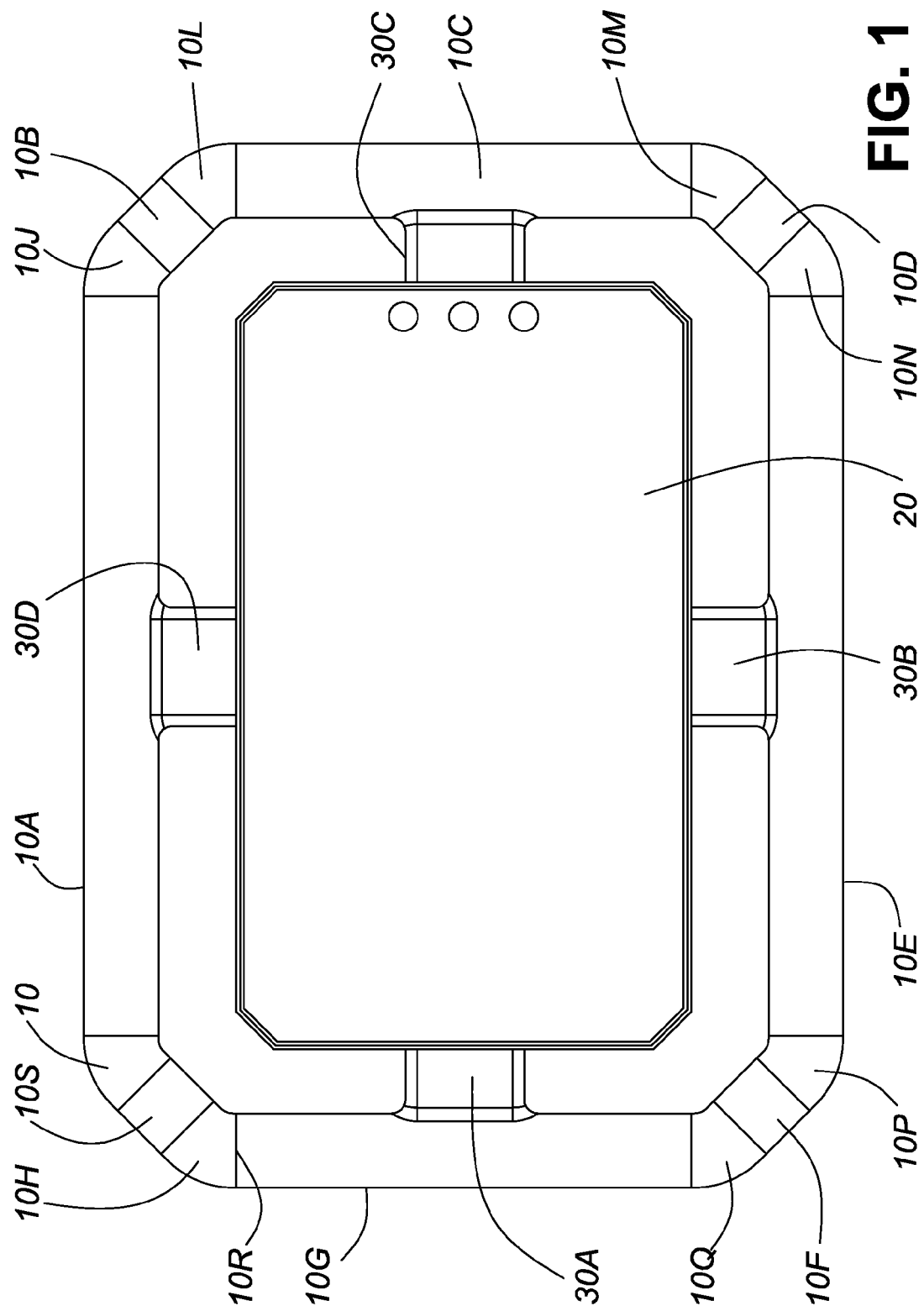
FIG. 1 is a front elevation view of a handle attached to a touch screen computing device according to one embodiment of the present invention.

FIG. 1 is a front elevation view of a handle 10 attached to a touch screen computing device 20 according to one embodiment of the present invention. The handle 10 is affixed to the computing device 30 through 4 bridging pieces 30A, 30B, 30C, 30D. The front view of FIG. 1 shows the touch screen of the computing device 20. As shown in FIG. 1, the handle 10 has an octagonal shape with eight (8) edges, 10A, 10B, 10C, 10D, 10E, 10F, 10G, and 10H. Each pair of adjacent edges meets at rounded edges 10J, 10L, 10M, 10N, 10P, 10Q, 10R, and 10S. As shown, the four bridging pieces 30A, 30B, 30C, 30D affix the handle 10 to the computing device 20, such that there are four corresponding spaces between the handle and the computing device, to enable the infant to grasp the handle and to simultaneously be able to manipulate the touch screen.

In addition, the handle 10 may be a partial handle that does not surround the circumference of the computing device 20. With a partial handle, one or more bridging pieces may not be required to affix the handle to the computing device. For example, a handle or partial handle may be directly affixed to the computing device without a bridging piece.

Figure 2:
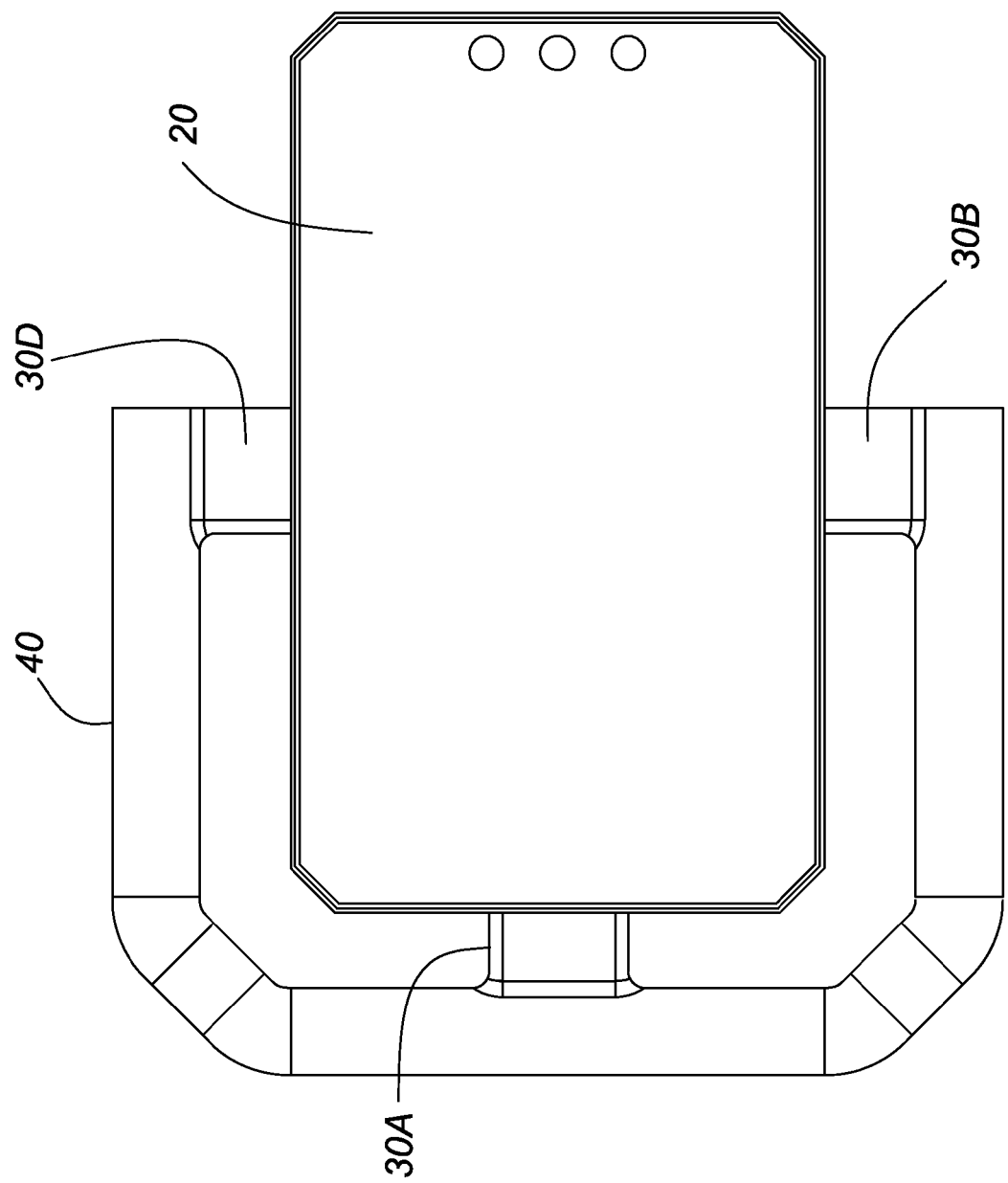
FIG. 2 is a front elevation view of a partial handle attached to a touch screen computing device according to another embodiment of the present invention.

FIG. 2 is a front elevation view of a partial handle 40. The partial handle 40 is affixed to the touch screen computing device through three bridging pieces 30A, 30B, 30D. As mentioned above, other partial handle configurations are contemplated by the present invention.

Figure 3:
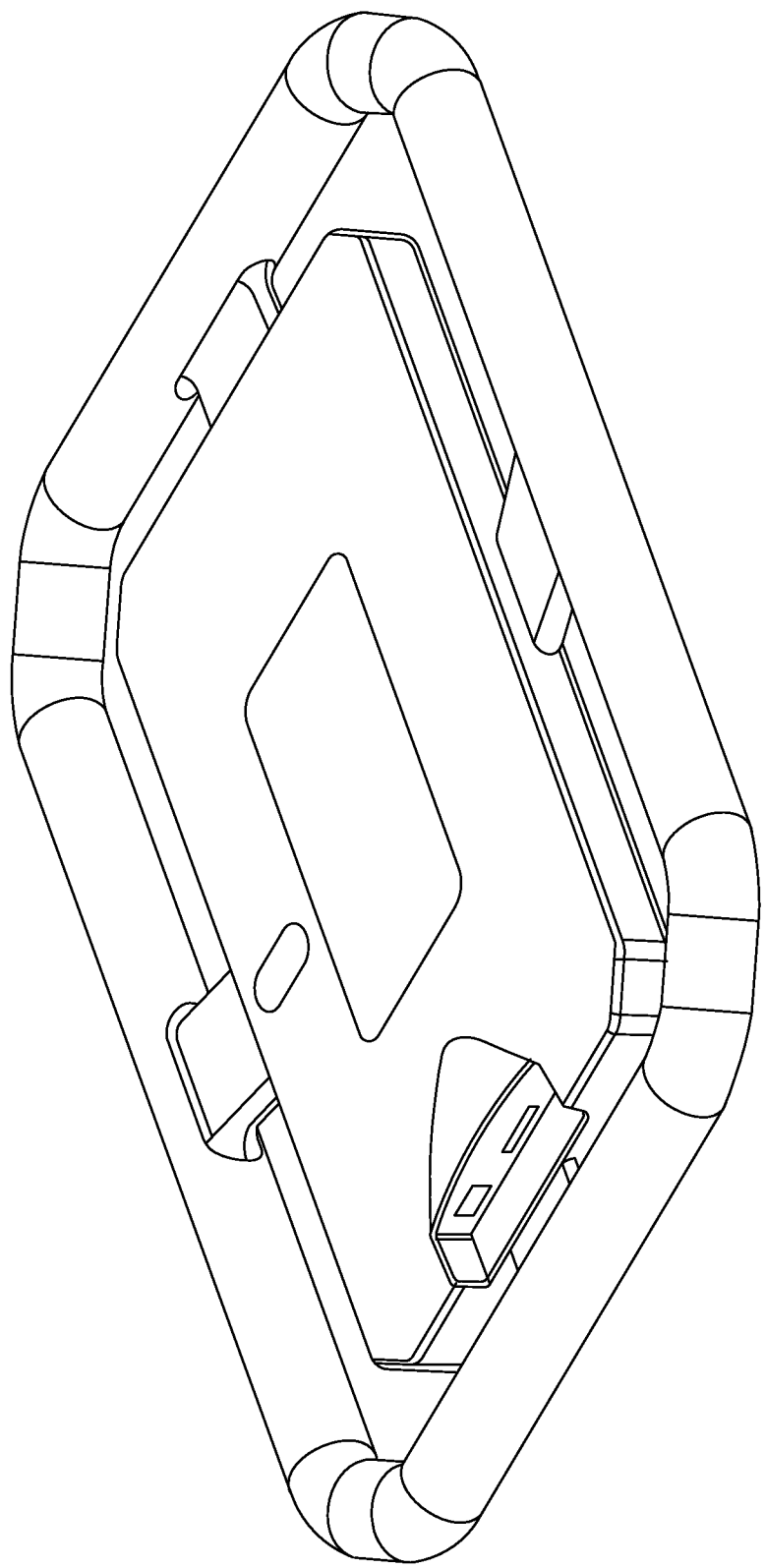
FIG. 3 is a first rear perspective view of the handle shown in FIG. 1 attached to a touch screen computing device according to one embodiment of the present invention.

FIG. 3 is a first rear perspective view of the handle 10 attached to a touch screen computing device 20.

Figure 4:
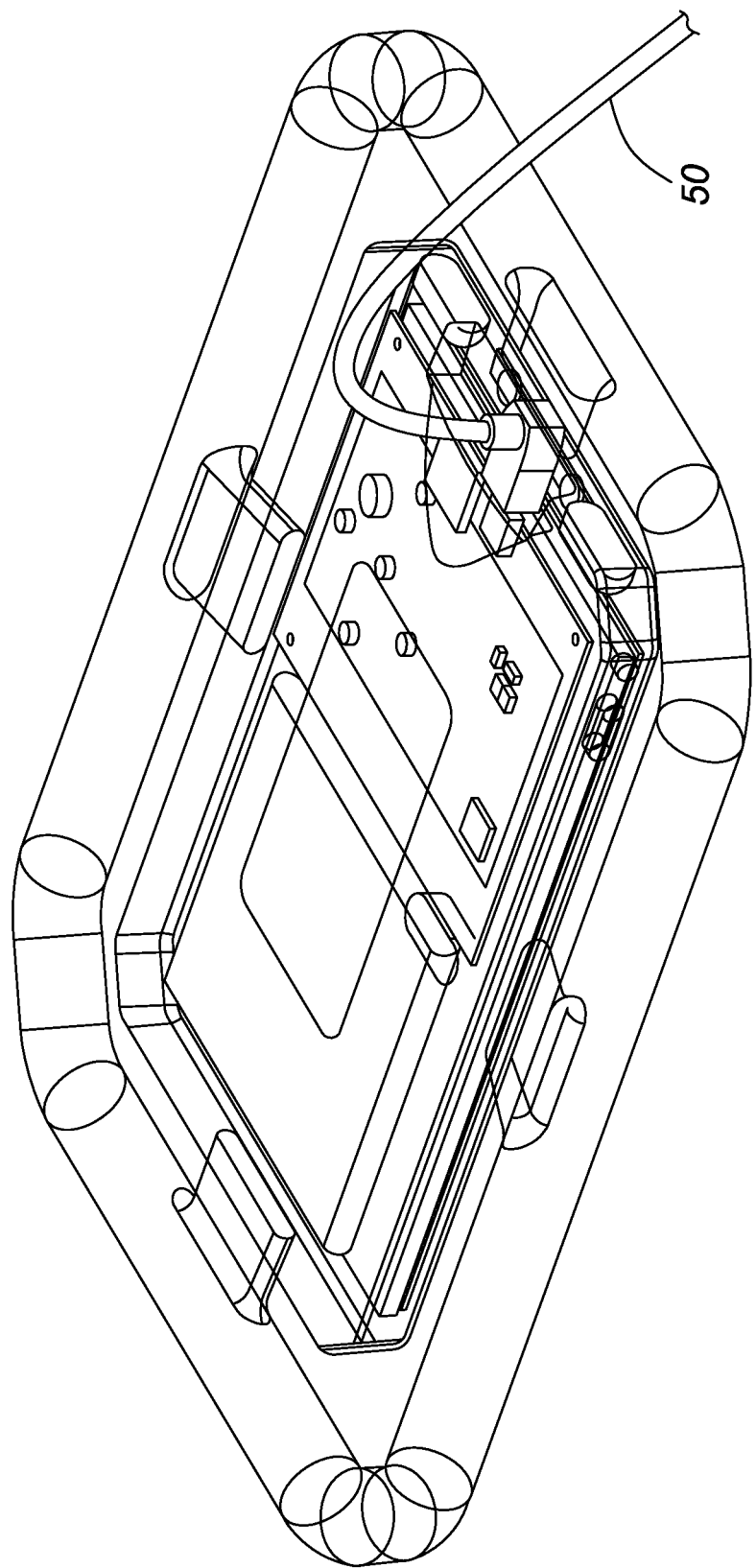
FIG. 4 is a second rear perspective view of the handle of the handle shown in FIG. 1 attached to a touch screen computing device and with a portion of a cable connected to the computing device according to one embodiment of the present invention.

FIG. 4 is a second rear perspective view of the handle 10 attached to a touch screen computing device 20 and with a portion of a cable 50 connected to the computing device 20. It should be noted that the cable 50 may be connected to the computing device 20 at a position different from that illustrated in FIG. 4. The cable connection may be positioned at whichever position may be deemed suitable for a data and/or power cable.

Figure 5:
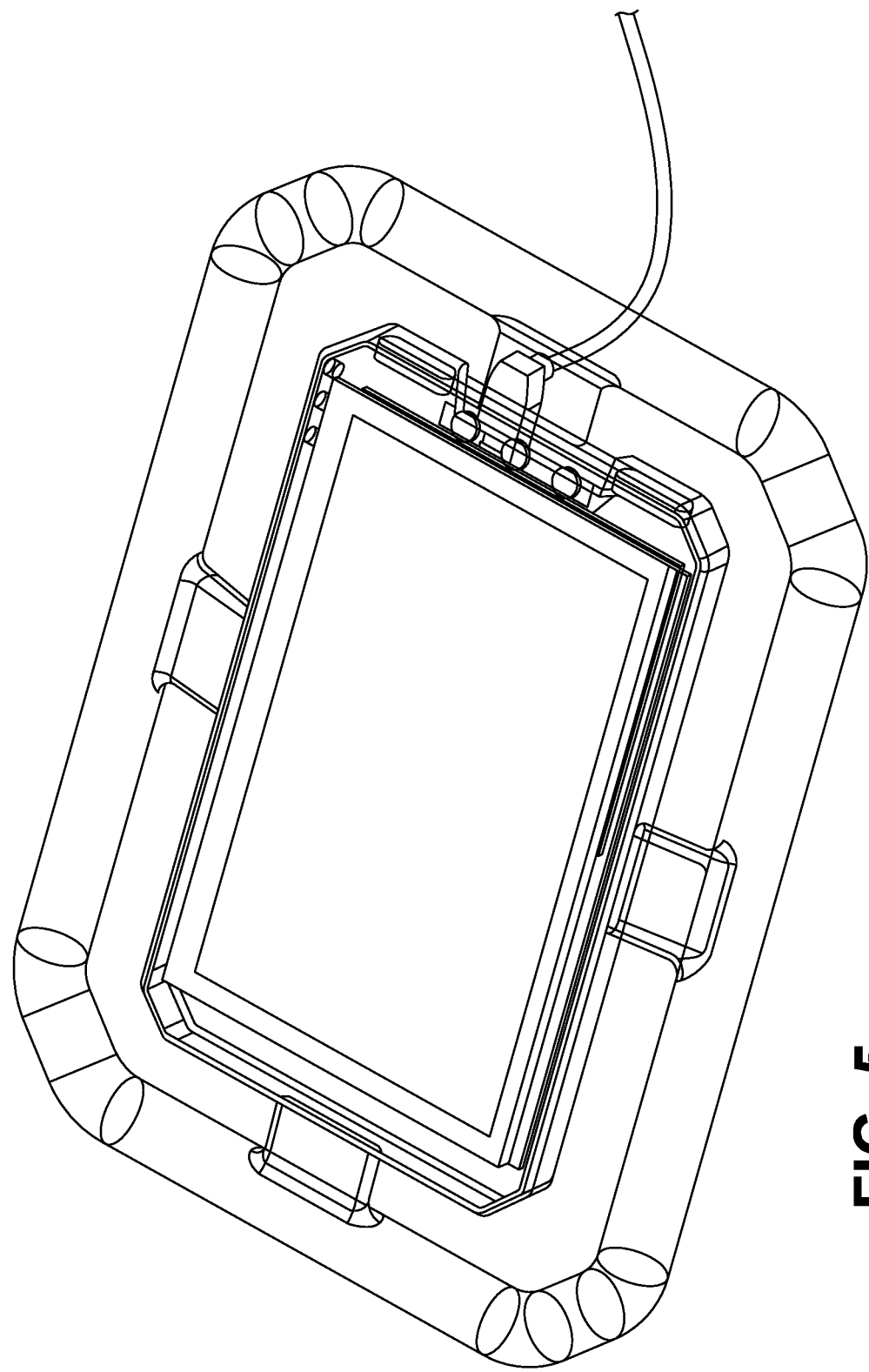
FIG. 5 is a front perspective view of the embodiment illustrated in FIG. 4.

FIG. 5 is a front perspective view of the handle 10 attached to a touch screen computing device 20.

FIGS. 4 and 5 show that the handle has a round cross-sectional shape and is, generally, tubular in appearance. However, a square-, rectangular-, triangular cross-sectional shape may also be contemplated by the present invention. In accordance with other embodiments of the present invention, many other shapes may be contemplated by a person of skill in the art.

In addition, the present invention is not limited to rounded edges 10J, 10L, 10M, 10N, 10P, 10Q, 10R, and 10S. While rounded edges may be preferable, squared and other shaped edges are also contemplated by the present invention.

The handle may be made of silicone or any other suitable material that would be safe for users such as infants to mouth, gum, or chew, etc. The handle may also be made of silicone covered metal or plastic or some other variant. For use by infants, it is important that according to one embodiment of the present invention the handle be safe for mastication (i.e., chewing or gumming) by infants.

It should also be mentioned that the handle 10 may be permanently or removably affixed to the computing device 20. A skilled artisan would know of many mechanical mechanisms (not shown) that may be used to removably or permanently attach the handle 10 to the computing device 20. All of these mechanisms are contemplated by the present invention.

As mentioned previously, the computing device 20 may be a tablet with a touch screen. The diagonal length of the screen may be in the range of at least 5" to about 12" or more. The circumference of the handle may be at least approximately 10 mm to approximately 20 mm. In one embodiment, the circumference of the handle may be of any size provided that infants can grip the handle and wrap at least 3 fingers around the handle. The present invention also contemplates larger or smaller dimensions for young children and disabled persons. Therefore, the present invention is not limited to any specific circumferential dimensions of the handle.

The present invention is not limited to the touch screen computing device, as shown in FIGS. 1 to 5. Many other computing devices are contemplated.

According to the present invention, the handle and computing device is suitable for infants, toddlers, small or young children and disabled persons.

The present invention contemplates that the computing device stores and runs software applications that are suitable for young children. The present invention also contemplates software applications that are suitable for disabled persons.

It should also be mentioned that the computing device may be a mobile device with mobile communication capability.

The embodiments of the invention described above are intended to be only exemplary, and not a complete description of every aspect the invention. The scope of the invention is therefore intended to be limited solely by the scope of the appended claims.

Having thus described the invention, what is claimed as new and secured by Letters Patent is:

1. A handle for a tablet computing device comprising:
the tablet computing device,
the handle being rigid and immovable and affixed to the tablet computing device and having a cross-sectional size such that the handle is suitable for use any person,
the handle being affixed to the tablet computing device by two vertical bridging pieces and at least two horizontal bridging pieces,
the handle extending from the peripheral edge along an entire circumference of the tablet computing device,
a first of the at least two horizontal bridging pieces being affixed to a vertical side of the tablet computing device and a second of the at least two horizontal bridging pieces being affixed to an opposite vertical side of the tablet computing device,
one of the two vertical bridging pieces being affixed to a horizontal side of the tablet computing device, and another one of the two vertical bridging pieces being affixed to an opposite horizontal side of the tablet computing device, and
the handle having a circular cross-section in shape and is affixed to the tablet computing device such that there are at least four corresponding spaces between the handle and the tablet computing device, to enable a user to grasp the handle and to simultaneously manipulate the tablet computing device.

2. The handle as in claim 1, wherein the handle is permanently affixed to the tablet computing device.

3. The handle as in claim 1, wherein the handle is removably affixed to the tablet computing device.

4. The handle as in claim 1, wherein the handle is constructed from a non-toxic material.

5. The handle as in claim 1, wherein the handle is made of silicone.

6. The handle as in claim 1, wherein the tablet computing device is a touch screen computing device.

7. The handle as in claim 1, wherein the tablet computing device is a mobile device with mobile communications capability.

* * * * *